(12) United States Patent
Love

(10) Patent No.: US 9,469,328 B2
(45) Date of Patent: *Oct. 18, 2016

(54) UNIVERSAL SKI CONVERSION ASSEMBLY

(71) Applicant: Charles M. Love, Durango, CO (US)

(72) Inventor: Charles M. Love, Durango, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,984

(22) Filed: May 11, 2015

(65) Prior Publication Data

US 2015/0291202 A1    Oct. 15, 2015

Related U.S. Application Data

(63) Continuation-in-part of application No. 13/682,226, filed on Nov. 20, 2012, now Pat. No. 9,027,939, which is a continuation-in-part of application No. 12/916,091, filed on Oct. 29, 2010, now abandoned.

(60) Provisional application No. 61/256,503, filed on Oct. 30, 2009.

(51) Int. Cl.
| | |
|---|---|
| *B62B 19/02* | (2006.01) |
| *B62B 17/08* | (2006.01) |
| *B62B 9/00* | (2006.01) |
| *B62K 13/00* | (2006.01) |
| *B62K 27/00* | (2006.01) |
| *B62B 5/06* | (2006.01) |

(52) U.S. Cl.
CPC ............... *B62B 19/02* (2013.01); *B62B 9/00* (2013.01); *B62B 17/08* (2013.01); *B62K 13/00* (2013.01); *B62K 27/003* (2013.01); *B62B 5/068* (2013.01); *B62B 2206/006* (2013.01)

(58) Field of Classification Search
None
See application file for complete search history.

(56) References Cited

U.S. PATENT DOCUMENTS 75,812 A * 3/1868 Thompson ............ B62B 19/02
280/13

2,237,471 A * 4/1941 Billings ................. B64C 25/52
280/13
4,805,546 A * 2/1989 Geller ................ B63B 35/7926
114/127
9,027,939 B2* 5/2015 Love .................... B62K 27/003
280/13
2010/0289231 A1* 11/2010 Huot ...................... B62B 19/02
280/13
2013/0214500 A1* 8/2013 Love .................... B62K 27/003
280/13

OTHER PUBLICATIONS

Chariot Carriers: Bike Trailers, Jogging Strollers and more, for bicycle riders and joggers. http://chariotcarriers.com/english/html/conversion/kits.php7conID=5(6/15/2011 7:50:25 AM); Jun. 15, 2011.
Build your own ski pulk or mountaineering sled or gear sled. http://www.skipulk.com/index.html[6/15/2011 7:51:16 AM], Jun. 15, 2011.
Wilderness Engineering, BaseCamp. http://www.wildernesengineering.com/BaseCamp.html[6/15/2011 7:52:05 AM]; Jun. 15, 2011.

* cited by examiner

*Primary Examiner* — John Walters
*Assistant Examiner* — Hilary L Johns
(74) *Attorney, Agent, or Firm* — Chester Paul Maliszewski

(57) ABSTRACT

A ski conversion assembly including: braces for attachment to skis and an axle of a stroller or trailer; and a rigger element for connecting to a ski and including a runner element. In a first position, the runner element is locatable between the first and second skis. In a second position, the runner element is locatable beyond the first ski in a direction from the second ski toward the first ski. A ski conversion assembly, including: braces for attachment to skis and an axle of a stroller or trailer; and a brake element including a first portion arranged to be fixedly secured to an end of a ski, a second portion pivotably connected to the first portion and arranged to extend past the end of the ski, and a resilient element urging the second portion in a direction from a top of the ski toward a bottom of the ski.

20 Claims, 13 Drawing Sheets

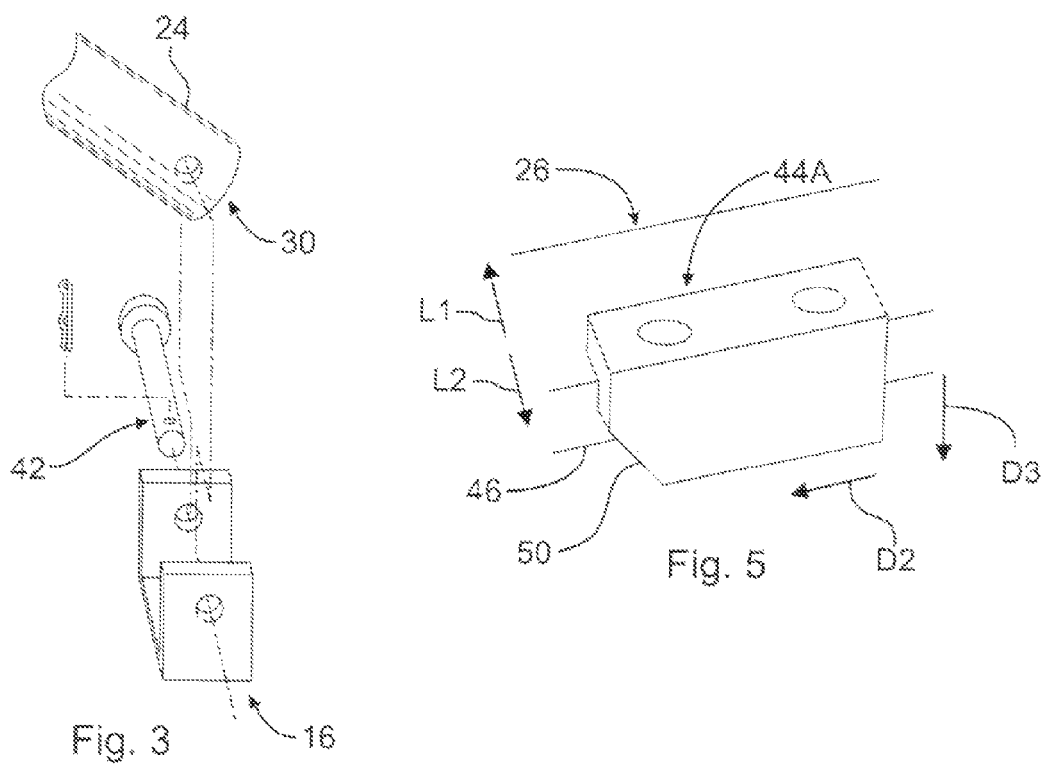
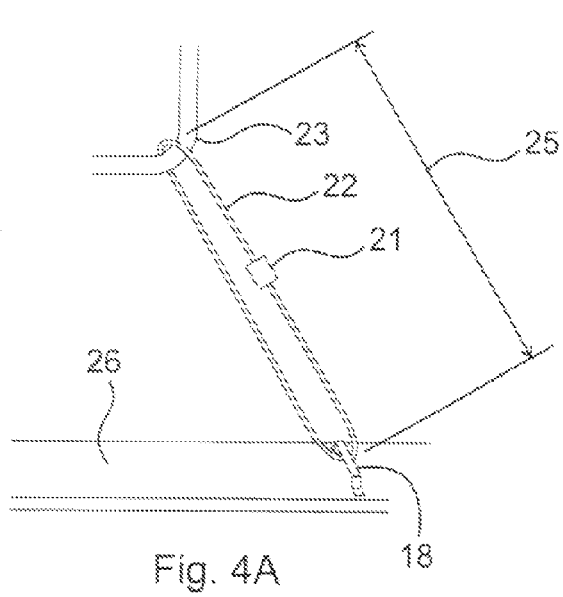

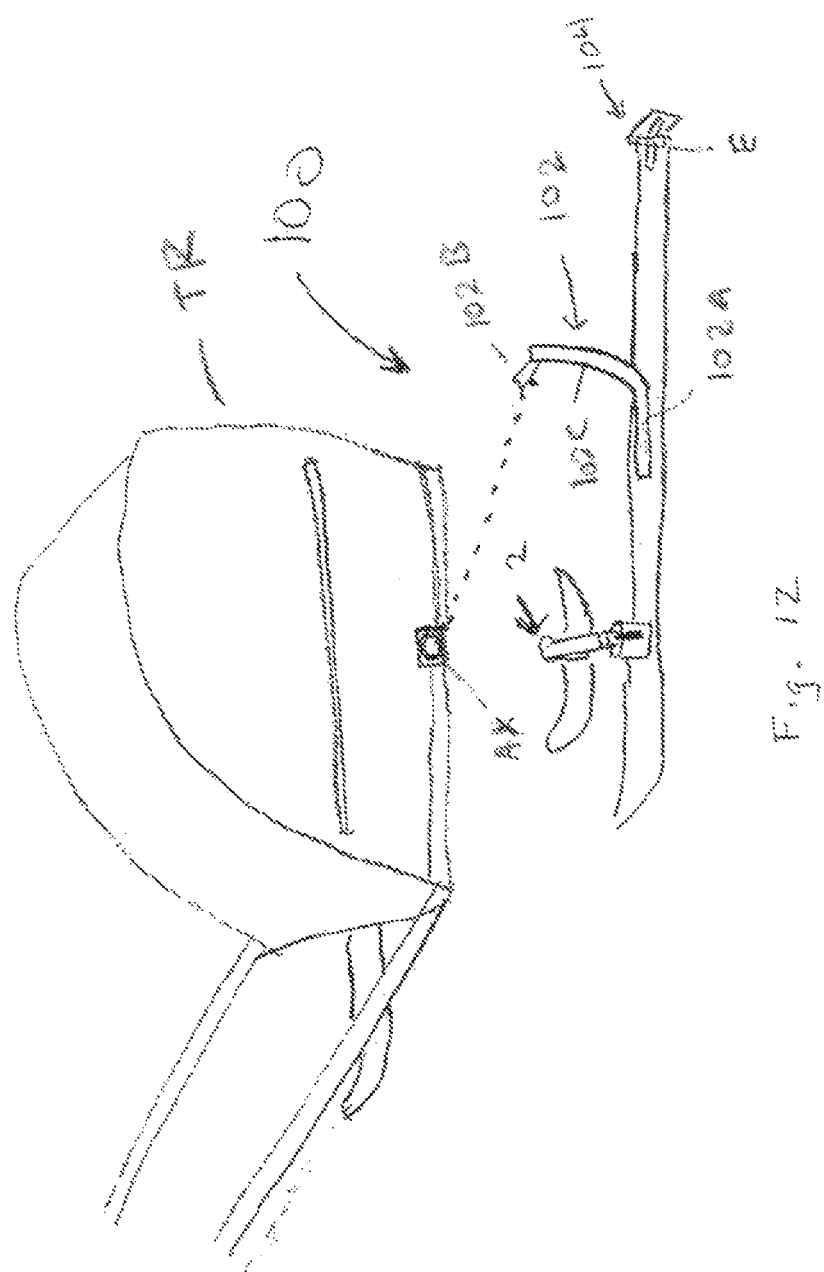

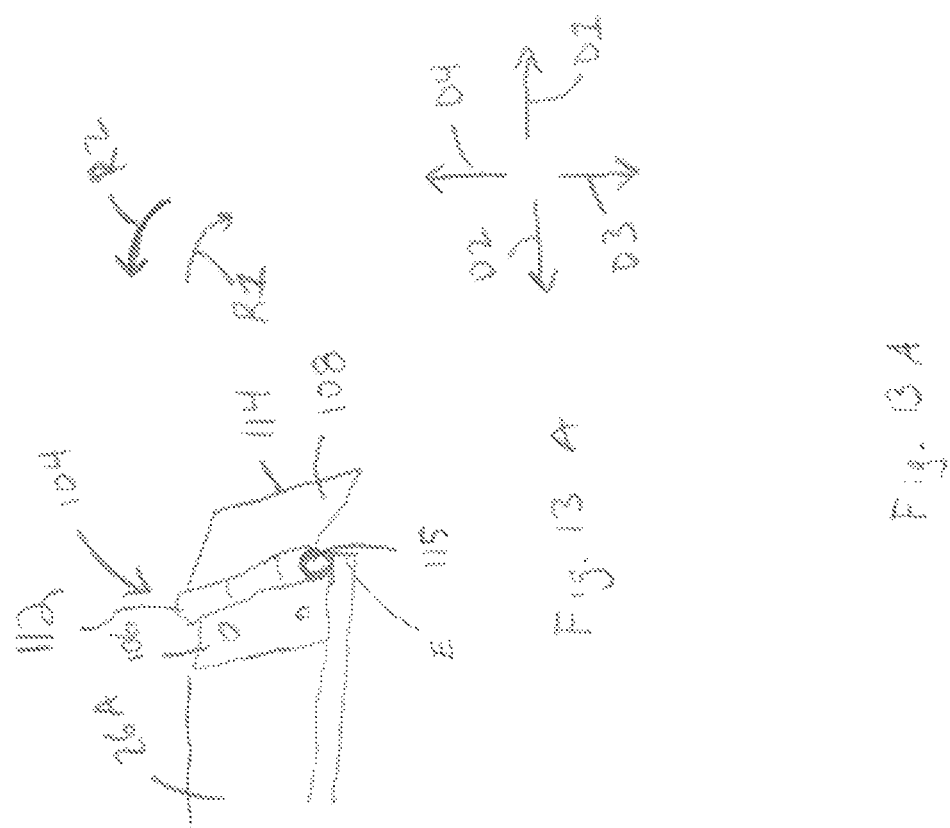

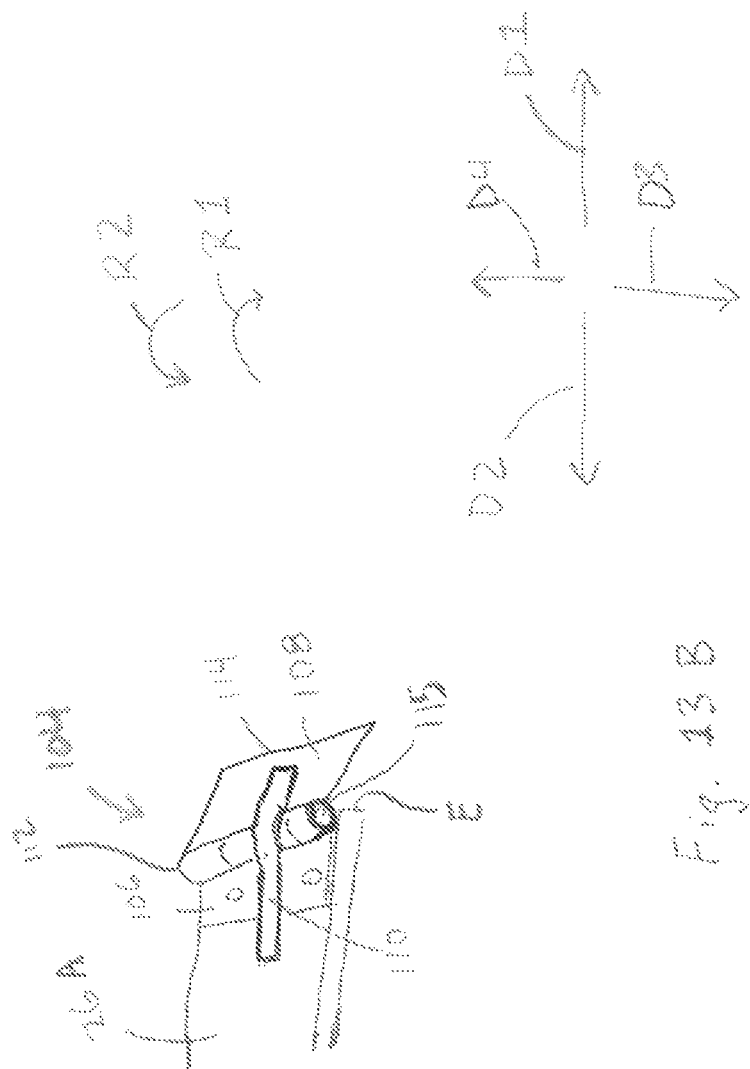

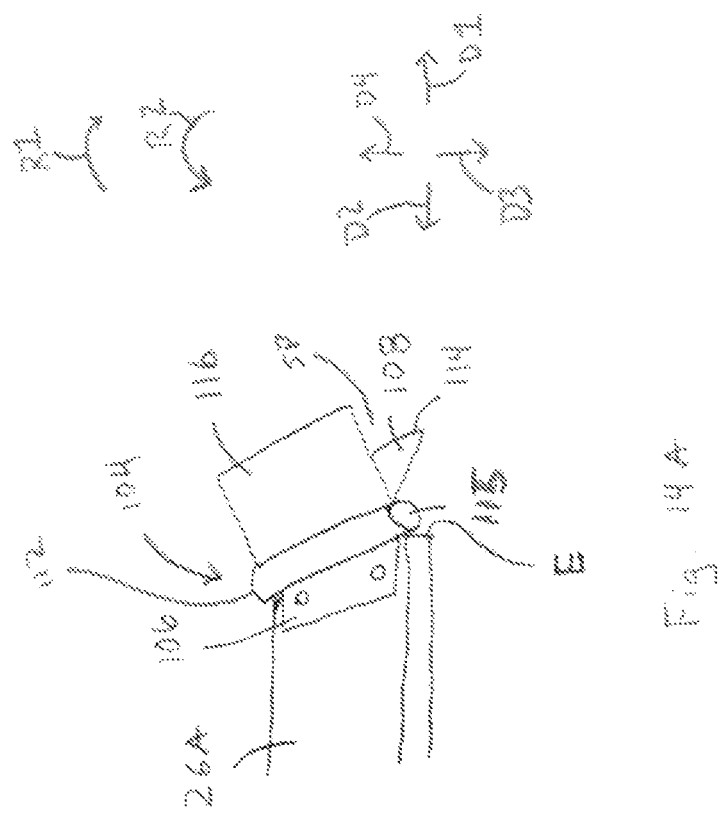

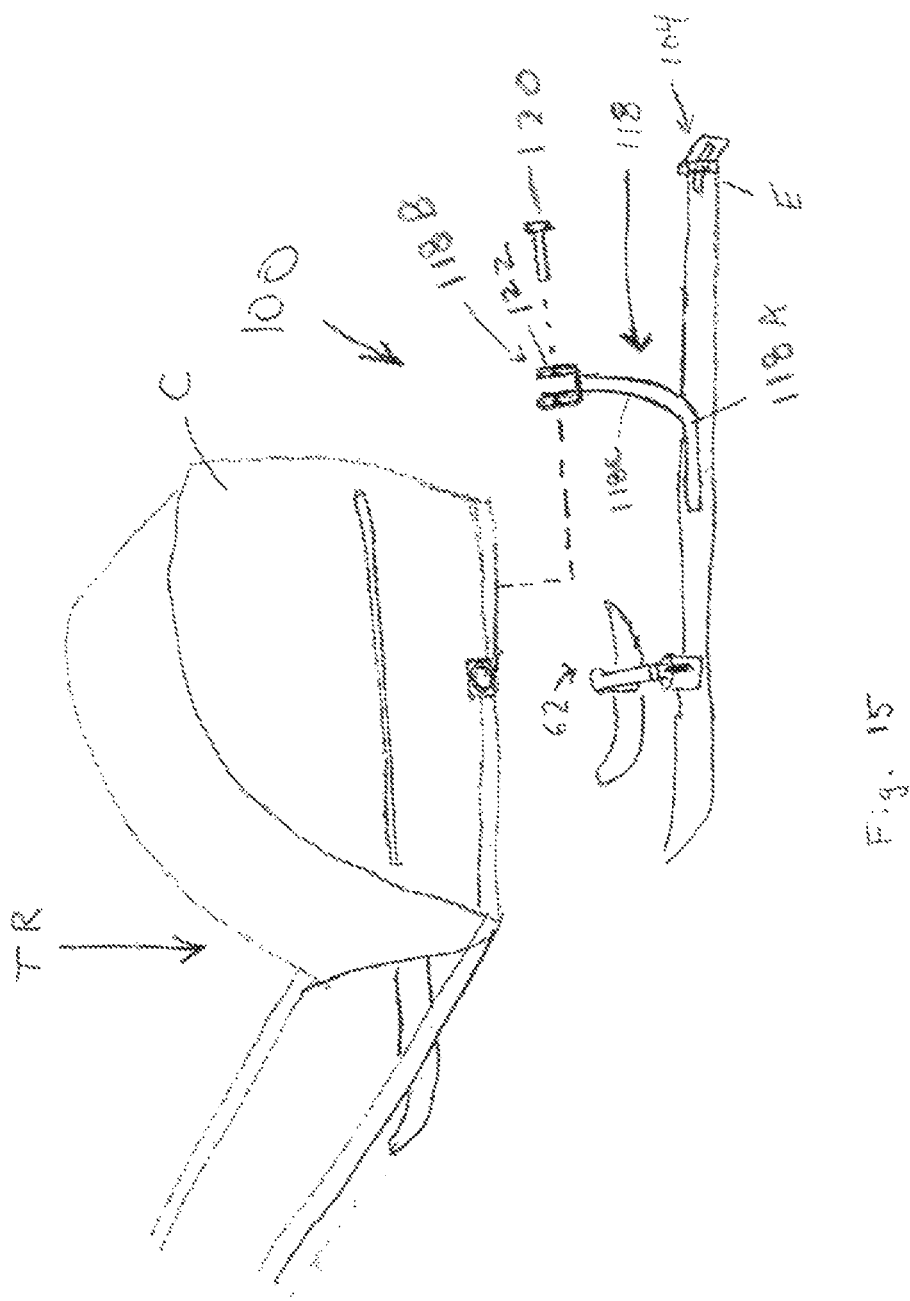

UNIVERSAL SKI CONVERSION ASSEMBLY

CROSS-REFERENCE TO RELATED APPLICATIONS

This is a continuation-in-part patent application under 35 USC 120 of U.S. patent application Ser. No. 13/682,226, filed Nov. 20, 2013, which application claims the benefit under 35 USC 120 of U.S. patent application Ser. No. 12/916,091, filed Oct. 29, 2010, which application claims the benefit under 35 U.S.C. 119(e) of U.S. Provisional Application No. 61/256,503, filed Oct. 30, 2009 which applications are incorporated herein by reference in their entirety.

FIELD OF THE INVENTION

The present disclosure relates to improvements in ski conversion devices for a stroller, bicycle trailer, or trailer. In particular, the present disclosure relates to a rigger ski conversion device and a brake ski conversion device that are adapted for use with a wide variety of stroller, bicycle trailer, and trailer configurations.

BACKGROUND OF THE INVENTION

The prior art teaches ski conversion kits that fail to provide adequate stability and tracking functionality.

BRIEF SUMMARY OF THE INVENTION

According to aspects illustrated herein, there is provided a ski conversion assembly for a stroller or trailer with first and second wheels, including: first and second braces for attachment to the stroller or trailer and first and second skis; and a rigger element for connecting to the first ski and including a runner element, wherein in a first position, the runner element is locatable between the first and second skis or beyond the first ski in a direction from the second ski toward the first ski.

According to aspects illustrated herein, there is provided a ski conversion assembly for a stroller or trailer with first and second wheels, including: first and second braces for attachment: to the stroller or trailer and first and second skis; and a brake element including a first portion arranged to be fixedly secured to an end of the first ski and a second portion pivotably connected to the first portion and arranged to extend past the end of the first ski.

According to aspects illustrated herein, there is provided a ski conversion assembly for a stroller or trailer, including: first and second braces for attachment to first and second skis and for attachment to an axle of the stroller or trailer, respectively; and a rigger element for connecting to the first ski and including a runner element. In a first position, the runner element is locatable: between the first and second skis; or beyond the first ski in a direction from the second ski toward the first ski.

According to aspects illustrated herein, there is provided a ski conversion assembly for a stroller or trailer, including: first and second braces for attachment to first and second skis and for attachment to an axle of the stroller or trailer, respectively; and a brake element including a first portion arranged to be fixedly secured to an end of the first ski and a second portion pivotably connected to the first portion and arranged to extend past the end of the first ski.

According to aspects illustrated herein, there is provided a ski conversion assembly for a stroller or trailer, including: first and second braces for attachment to first and second skis and for attachment to a carriage of the stroller or trailer, respectively; and a rigger element for connecting to the first ski and including a runner element. In a first position, the runner element is locatable: between the first and second skis; or beyond the first ski in a direction from the second ski toward the first ski.

According to aspects illustrated herein, there is provided a ski conversion assembly for a stroller or trailer, including: first and second braces for attachment to first and second skis and for attachment to a carriage of the stroller or trailer, respectively; and a brake element including a first portion arranged to be fixedly secured to an end of the first ski and a second portion pivotably connected to the first portion and arranged to extend past the end of the first ski.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 3 is an exploded detail of a yoke connection brace shown in FIG. 1;

FIG. 4A is a schematic detail of an adjustment device for a orientation element;

FIG. 4B is a schematic detail of a rigid orientation element;

FIG. 5 is a detail of example tracking element for a ski conversion device shown;

FIG. 12 is a schematic drawing of a rigger and brake connected to a ski arranged for connection to an axle of a trailer;

FIG. 13A is a detail of a brake element;

FIG. 13B is a detail of the brake element in FIG. 13A, with a resilient element;

FIG. 14A is a detail of a brake element enclosing a space;

FIG. 14B is a detail of the brake element in FIG. 14A, with a resilient element; and, FIG. 15 is a schematic drawing of a rigger and brake connected to a ski arranged for connection to a body of a trailer.

DETAILED DESCRIPTION OF THE DISCLOSURE

At the outset, it should be appreciated that like drawing numbers on different drawing views identify identical, or functionally similar, structural elements of the present disclosure. It is to be understood that the present disclosure as claimed is not limited to the disclosed aspects.

Unless defined otherwise, all technical and scientific terms used herein have the same meaning as commonly understood to one of ordinary skill in the art to which the present disclosure belongs. Although any methods, devices or materials similar or equivalent to those described herein can be used in the practice or testing of these embodiments, some embodiments of methods, devices, and materials are now described.

Figure 1:
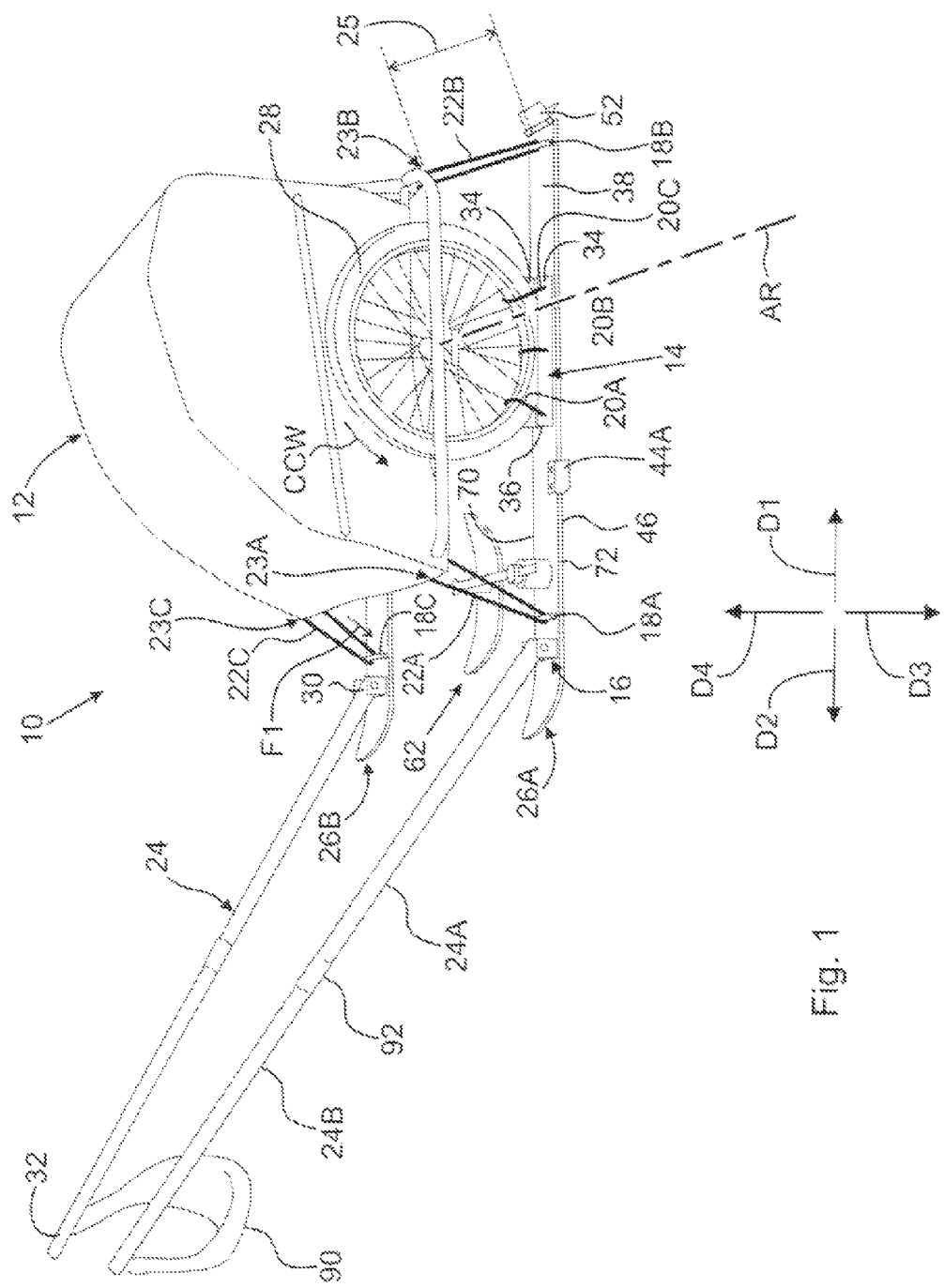
FIG. 1 is a perspective view of a ski conversion device for a stroller or a bicycle trailer.

FIG. 1 is a perspective view of ski conversion device, or kit, 10 for bicycle trailer 12.

Figure 2:
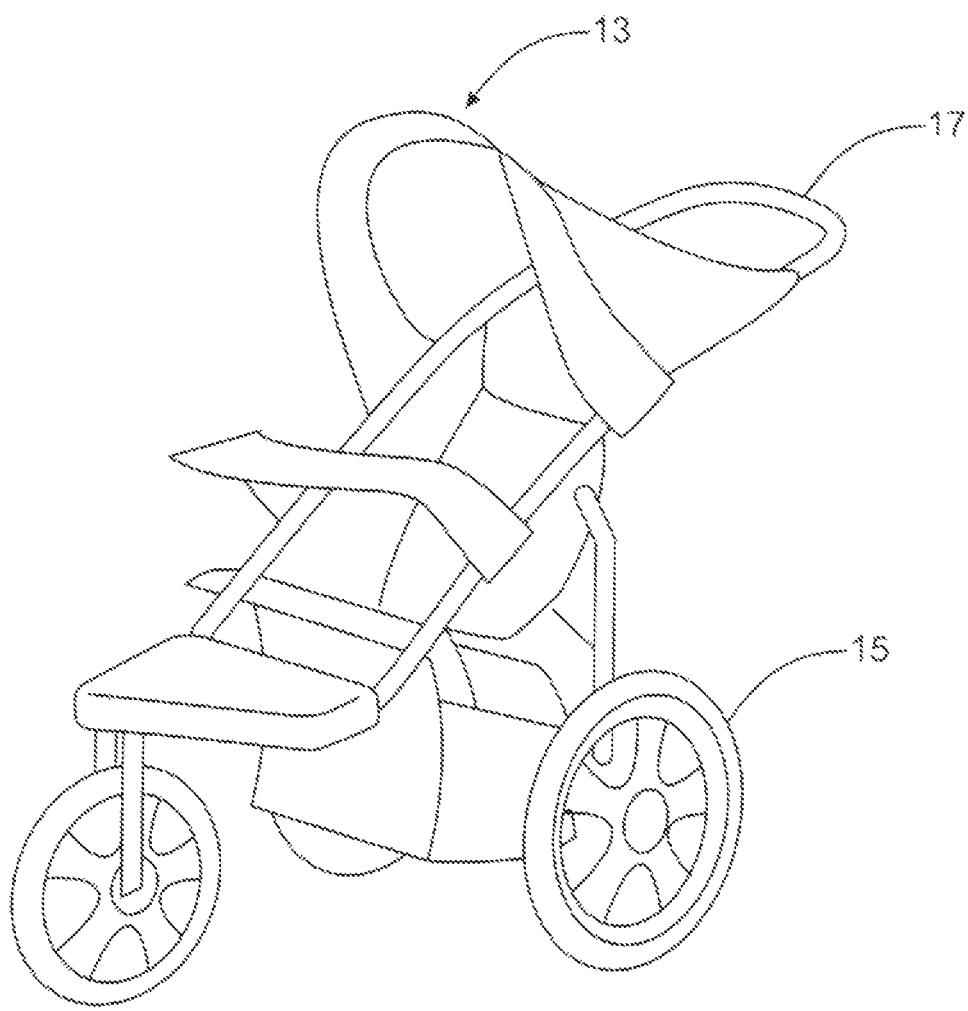
FIG. 2 is a perspective view of an example stroller useable with the ski conversion device shown in FIG. 1.

FIG. 2 is a perspective view of example stroller 13 useable with ski conversion device 10.

FIG. 3 is a detail of a yoke connection brace. The following should be viewed in light of FIGS. 1 through 3. The discussion that follows is addressed to device 10 and bicycle trailer 12; however, it should be understood that unless indicated otherwise, the discussion also is applicable to device 10 and stroller 13. Specifically, wheels 15 of the stroller is analogous to wheels 28 of trailer 12 and the operations and configurations described regarding device 10 and wheels 28 are applicable to stroller 13 and wheels 15. Further, the connection of orientation elements 22 to trailer 12 is analogous to the connection of orientation elements 22 to stroller 13. In general, device 10 is connected to the trailer as described infra, to enable the trailer to be connected to a source of energy for propelling the ski conversion device, for example, a person on skis, snowshoes, or foot. Device 10 includes wheel braces 14, yoke braces 16, orientation braces 18, connecting elements 20, orientation elements 22, and yokes 24. Wheel braces 14 are for attachment to skis 26 and for receiving wheels 28 for the trailer. The yoke braces 16 and orientation braces 18 are for attachment to the ski. The connecting elements are for fixing the wheels with respect to the wheel braces. The orientation elements are for connecting the trailer to the orientation braces and for fixing an orientation of the trailer with respect to the skis as described supra. Each yoke includes end 30 connected to a respective yoke brace. Distal ends 32 of the yokes are attachable to a source of energy for propelling the ski conversion device, as further described below. In an example embodiment, yoke braces 16 are integral to skis 26, for example, formed of a same piece of material as the top of the ski. In an example embodiment, orientation braces 18 are integral to skis 26, for example, formed of a same piece of material as the top of the ski.

The wheel braces, orientation braces, and yoke braces are attached to the skis by any means known in the art, including, but not limited to, threaded fasteners or rivets. Any strap or securing device known in the art can be used for elements 20, including, but not limited to, resilient straps, quick-release devices, and ratcheting devices.

In an example embodiment, the wheel brace is U-shaped, or channel-shaped piece with side walls 34 and bottom portion 36 joining the side walls. In an example embodiment, the bottom wall is in contact with top surface 38 of the skis. The width of the wheel braces (between walls 34) is sufficient to receive any bicycle trailer tire known in the art. In an example embodiment (not shown), each wheel brace is integrally formed with a respective ski, for example, the wheel brace is formed of a same piece of material forming the top of the ski.

In an example embodiment, a single connecting element is used to fix a wheel with respect to a wheel brace. In an example embodiment, multiple connecting elements, for example, 20A through 20C are used to fix a wheel with respect to a wheel brace. The multiple connection elements exert at least partially opposing forces in directions D1 and D2 on the wheel to further stabilize the wheel with respect to the wheel brace. It should be understood that other multiple connection element configurations are possible, such as only elements 20A and 20C without middle element 20B.

In an example embodiment, the yokes are pivotable with respect to the yoke braces. For example, the yoke braces include pins 42 passing through the braces and ends 30 of the yokes. The yokes are pivotable about the pins, and thus, pivotable with respect to the skis and the trailer. Any pin configuration known in the art can be used. In an example embodiment, the pins are configured for quick-disconnect by any means known in the art, for example, in a cotter pin arrangement, to enable easy connection and disconnection of the yokes from the yoke braces.

FIG. 4A is a schematic detail of adjustment device 21 for an orientation element. The following discussion is directed to a flexible orientation element. Each orientation element 22 includes one end for connection to a respective orientation brace and one end orientation elements 22 for connection to at least one point on the stroller or the bicycle trailer. Each orientation element 22 is for connection to separate points on the stroller or the bicycle trailer. For example: orientation element 22A is connected to brace 18A and is for connecting to at least one point 23A on the bicycle trailer; orientation element 22B is connected to brace 18B and is for connecting to at least one point 23B on the bicycle trailer, different from and separate from point 23A; and orientation element 22C is for connecting to at least one point 23C on the bicycle trailer different from and separate from points 23A and 23B. A fourth orientation element 22, connected to an orientation brace 18 on ski 26B and to at least one point 23 on trailer 12, is not visible in FIG. 1. The at least one point on trailer 12 for the fourth strap is different from points 23A-23C. Note that for stroller 13 handles 17 may be usable as connection points for orientation elements 22, for example for connection point 23B and the fourth connection point not visible in FIG. 1. In an example embodiment (not shown), the orientation elements at the back of the bicycle trailer or stroller can be connected to a same point or points. In an example embodiment (not shown), the orientation elements at the front of the bicycle trailer or stroller can be connected to a same point or points.

Trailer 12 includes axis of rotation AR for wheels 28 (note that AR is analogous to an axis of rotation for wheels 15 of stroller 13). Respective lengths 25 of orientation elements 22 are adjustable such that an orientation of the stroller or bicycle trailer with respect to the axis of rotation is fixed by orientation elements 22, as further described below. Stated otherwise, orientation elements 22 for a same ski 26 exert at least partially opposing forces in directions D1, D2, and D3 on the trailer to stabilize the trailer or stroller with respect to the skis and the axis of rotation. Any strap or flexible securing device known in the art can be used for flexible elements 22, including, but not limited to, resilient straps, quick-release devices, and ratcheting devices.

FIG. 4B is a schematic detail of rigid orientation element 22D. In an example embodiment, some or all of orientation elements 22 are rigid. For example, a rigid orientation element can be formed in a manner similar to that for the yokes and the discussion regarding yokes is applicable to the rigid orientation elements. In an example embodiment as shown in FIG. 4B, a single rigid element 22D is used in place of multiple orientation elements 22. In an example embodiment, element 22D is connected with pivoting or clamping arrangements. For example, one end of element 22D is connected to brace 18 with a pivoting connection, for example, using pin 93. In an example embodiment, element 22D is connected to the stroller or the bicycle trailer by clamp configuration 95.

FIG. 5 is a detail of example tracking element 44A. The skis include top surface 38 and bottom surface 46, opposite the top surface. In an example embodiment, the ski conversion device includes tracking element 44A fixedly connectable to a ski such that portion 50 of the tracking element extends beyond the bottom surface in direction D3 from the top surface toward the bottom surface. Element 44A enables movement of the ski in forward direction D2, while preventing undesirable sliding or slippage in lateral direction L1 or L2, orthogonal to D2. Element 44A can be connected to the ski by any means known in the art, including, but not limited to, threaded fasteners or rivets. In an example embodiment (not shown), each tracking element 44A is integrally formed with a respective ski, for example, the tracking element is formed of a same piece of material forming at least a portion of the ski. In FIG. 5, if ski 26 is ski 26A, portion 50 is at an outside edge of the ski. In FIG. 5, if ski 26 is ski 26B, portion 50 is at an inside edge of the ski. Thus, element 44A can be configured such that portion 50 is at an inside or an outside edge of a ski.

Figure 6A:
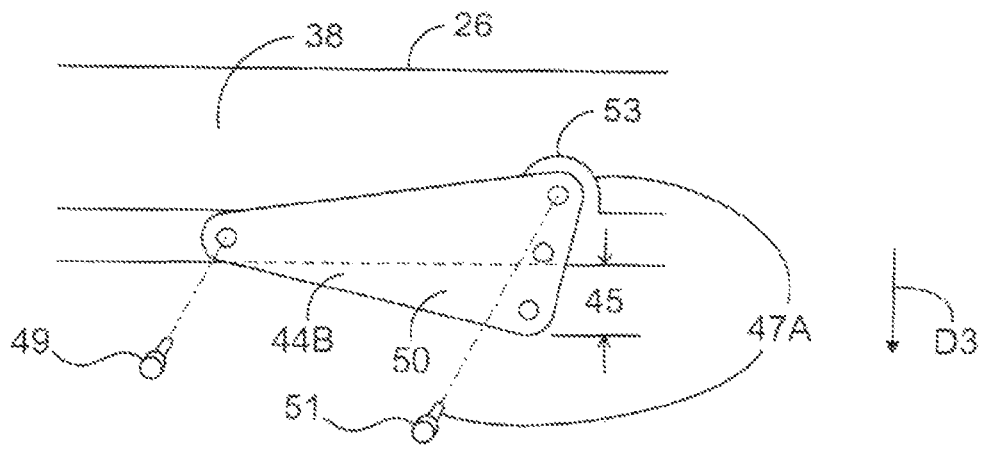
FIGS. 6A and 6B are respective schematic details of an example adjustable tracking element for a ski conversion device.
Figure 6B:
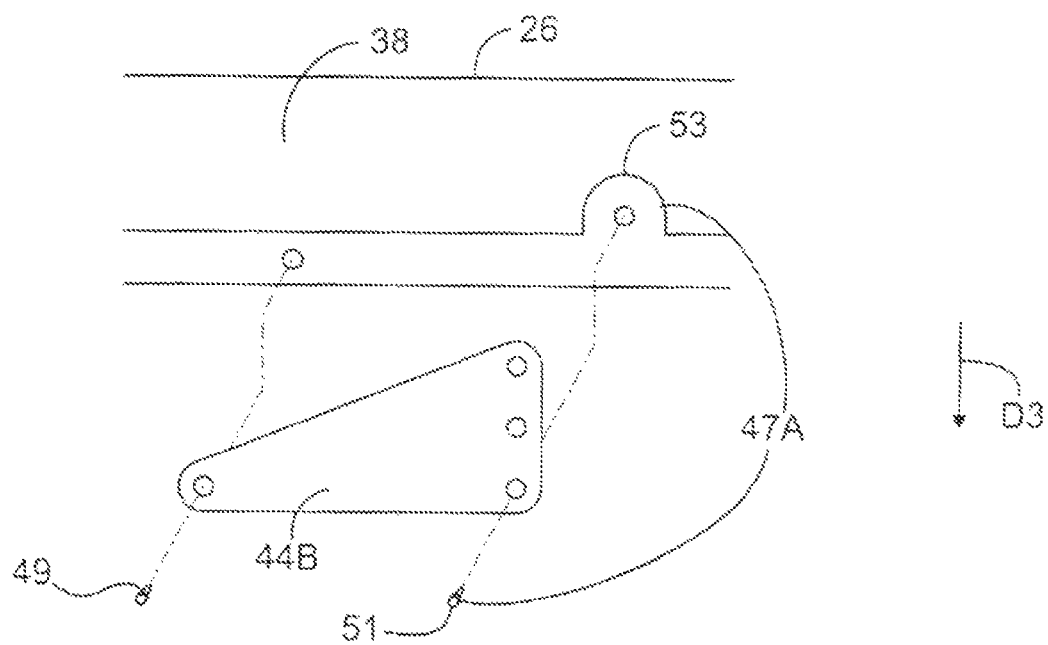

FIGS. 6A and 6B are respective details of example tracking element 44B for ski conversion device 10 shown in FIG. 1. In an example embodiment, the ski conversion device includes tracking element 44B fixedly connectable to a ski and adjustable such that in a first position, for example as shown in FIG. 6A, portion 50 of element 44B extends beyond bottom surface 46 of ski 26 in direction D3 from top surface 44 toward bottom surface 46. In a second position, for example as shown in FIG. 6B, portion 50 of element 44B extends no further than bottom surface 46 in direction D3. Thus, in the first position, element 44B performs the functions described above for element 44A, and in the second position, element 44B does not extend beyond surface 46 to provide the functions described for element 44A. In an example embodiment, depth 45 of portion 50 beyond surface 46 is adjustable. Adjusting and locking mechanism 47A is used to adjust the position of portion 50, set depth 45, and lock portion 50 in place. Mechanism 47A can be any adjusting or locking mechanism known in the art, including, but not limited to a clip arrangement, a pin arrangement, a ratchet system, a cam system, a lever system, a resilient element, or a dial/screw system. For example, in FIGS. 6A and 6B, element 44B pivots about pin 49 to control depth 45 and 47A is a pin mechanism using pin 51 and bracket 53 to lock element 44B in place.

Figure 7A:
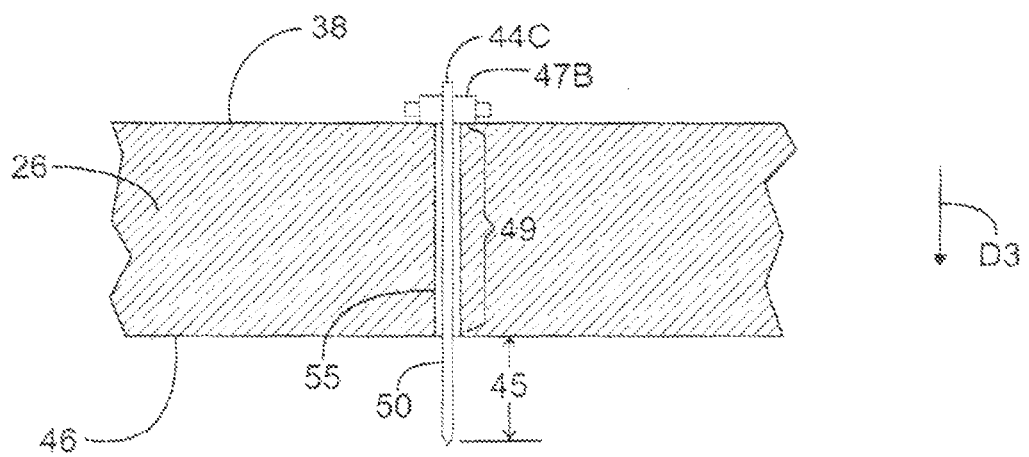
FIGS. 7A and 7B are respective cross-sectional schematic details of an adjustable tracking element for a ski conversion device.
Figure 7B:
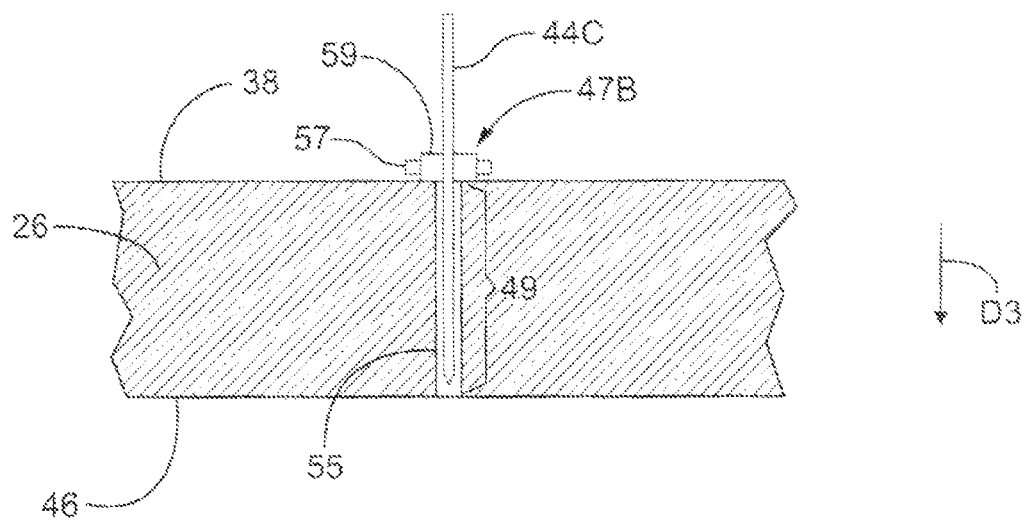

FIGS. 7A and 7B are respective cross-sectional details of tracking element 44C. In an example embodiment, the ski conversion device includes tracking element 44C fixedly connectable to a ski and adjustable such that in a first position, for example as shown in FIG. 7A, portion 50 of element 44C extends beyond bottom surface 46 of ski 26 in direction D3 from top surface 38 toward bottom surface 46. In a second position, for example as shown in FIG. 7B, portion 50 of element 44C extends no further than bottom surface 46 in direction D3. Thus, in the first position, element 44C performs the functions described above for element 44A, and in the second position, element 44C does not extend beyond surface 46 to provide the functions described for element 44A. In an example embodiment, depth 45 of portion 50 beyond surface 46 is adjustable. In an example embodiment, ski 26 includes opening 55.

In the position shown in FIG. 7A, portion 49 of element 44C is disposed in opening 55 and portion 50 of the tracking element extends beyond the bottom surface in direction D3 from the top surface toward the bottom surface. Thus, in the first position, element 44C performs the functions described above for element 44A, and in the second position, element 44C does not extend beyond surface 46 to provide the functions described for element 44A. In an example embodiment, depth 45 of portion 50 beyond surface 46 is adjustable. Adjusting and locking mechanism 47B is used to adjust the position of portion 50, set depth 45, and lock portion 50 in place. Mechanism 47B can be any adjusting or locking mechanism known in the art, including, but not limited to a clip arrangement, a pin arrangement, a ratchet system, a cam system, a lever system, a resilient element, or a dial/screw system. For example, in FIGS. 7A and 7B, 47B is a pin mechanism using pin 57 and bracket 59 to lock element 44C in place. It should be understood that opening 55 is not limited to any particular location on skis 26.

Although tracking element 44A is shown attached to ski 26A in FIG. 1, it should be understood, as noted above, that tracking element 44A can be attached to ski 26B instead. More generally, tracking elements 44A, 44B, or 44C can be attached to either of skis 26A and 26B. It also should be understood that a respective tracking element 44A, 44B, or 44C can be attached to each of the skis. It should be understood that more than one tracking element 44A, 44B, or 44C can be attached to a ski. It should be understood that a tracking element 44A, 44B, or 44C is not limited to a particular position on a ski, for example, a tracking element 44A, 44B, or 44C can be attached anywhere along the length of a ski and can be attached to an outside edge of a ski or can be attached to an inside edge of a ski, facing the other ski. Any combination of positions or numbers of tracking elements 44A, 44B, and 44C are possible. In an example embodiment not shown, tracking element 44 is connected to runner 66 described below.

Figure 8:
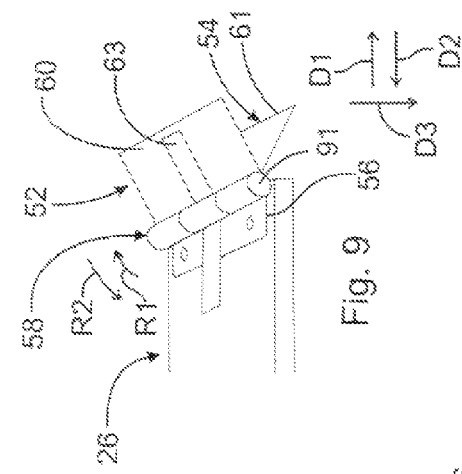
FIG. 8 is a detail of a brake element for a ski conversion device.

FIG. 8 is a detail of brake element 52. In an example embodiment, the ski conversion device includes brake element 52 with distal end 54 and end 56 for connection to an end of a ski. Distal end 54 includes distal edge 61. End 56 can be connected to the ski by any means known in the art, including, but not limited to, threaded fasteners or rivets. In an example embodiment, the brake element pivots with respect to the ski, for example, hinge, or pivot, 58 connects end 56 with body 60 of the brake element. For movement of the ski across a surface (not shown) in forward direction D2, the brake element is for pivoting with respect to the end of the ski such that the distal end and the distal edge slide over the surface without hindering movement in the forward direction. That is, the distal end and the distal edge do not dig into, wedge into, or burrow into, the surface and the brake element offers only nominal resistance to movement across the surface. Stated otherwise, the force interaction of the brake element with the surface tends to push the brake element away from the surface in rotational direction R2.

For movement of the ski across the surface in backward direction D1, the body and distal end of the brake element pivot with respect to the ski, for example in rotational direction R1, such that the distal end and the distal edge engages, burrows into, or digs into, the surface to resist movement of the ski in the backward direction. That is, the force interaction of the brake element with the surface tends to cause the brake element to dig into, wedge into, or burrow into the surface more readily, inhibiting the movement of the ski in direction D1. The distal end can include features such as surface texture, concavity, or protrusions to enhance burrowing into the surface.

Figure 9:
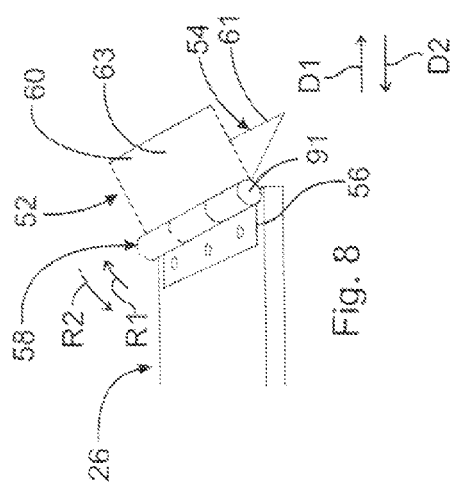
FIG. 9 is a schematic detail of a brake, with a resilient element, for a ski conversion device.

FIG. 9 is a schematic detail of brake element 52 with a resilient element 63, for the ski conversion device shown in FIG. 1. In an example embodiment, brake element 52 includes resilient element 63 urging distal end 54 and distal edge 61 in direction R1. Thus, the resilient element urges distal end 54 and distal edge 61 into positive engagement with the surface with which ski 26, to which the brake element is attached, is in contact. Thus, if the ski begins to displace in direction D1, the brake element engages the surface noted above and even more quickly blocks movement in direction D1. In an example embodiment, pivot 58 is formed as part of the ski, for example, pin 91 passes through an opening formed in the end of the ski.

In an example embodiment, brake element 52 is in its operational state at all times. That is, the brake element maintains contact with the surface noted above at all time without any action required by a user of device 10. Specifically, the user does not have to activate any type of engagement mechanism for the brake to be in contact with the surface noted above. In an example embodiment (not shown), brake element 52 is positionable so that the distal end and distal edge do not contact the surface noted above, for example, enabling backward movement of the skis when desired.

Figure 10:
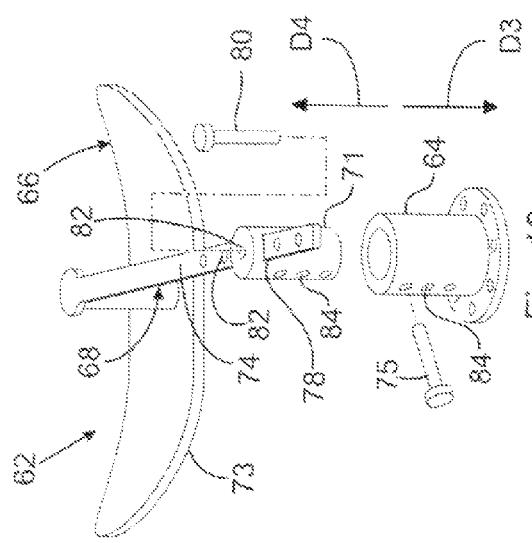
FIG. 10 is a detail of a rigger element for a ski conversion device.

FIG. 10 is a detail of rigger element 62 for ski conversion device 10.

Figure 11A:
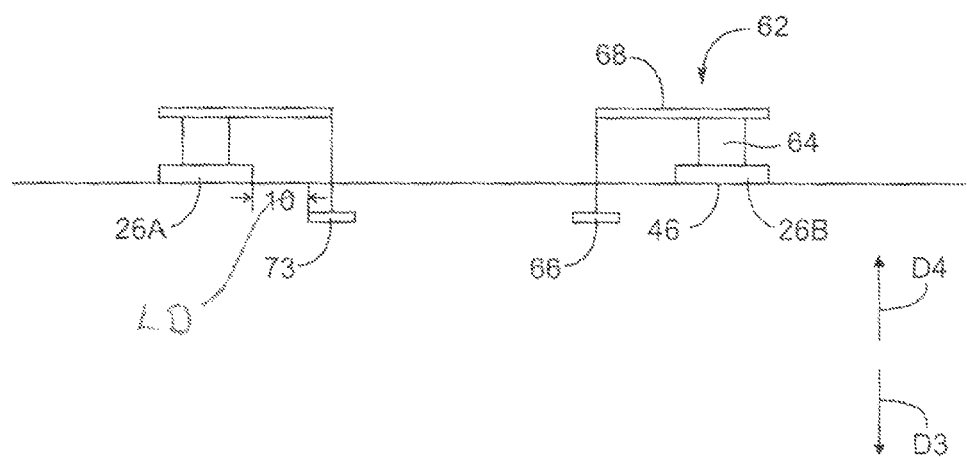
FIGS. 11A and 11B are schematic drawings showing respective configurations of a rigger element for a ski conversion device.
Figure 11B:
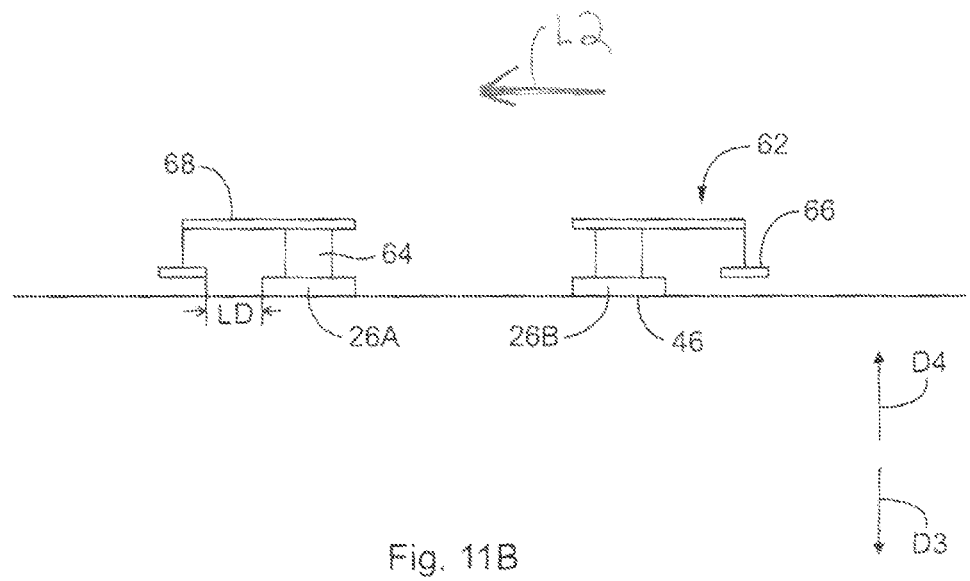
Figure 16:
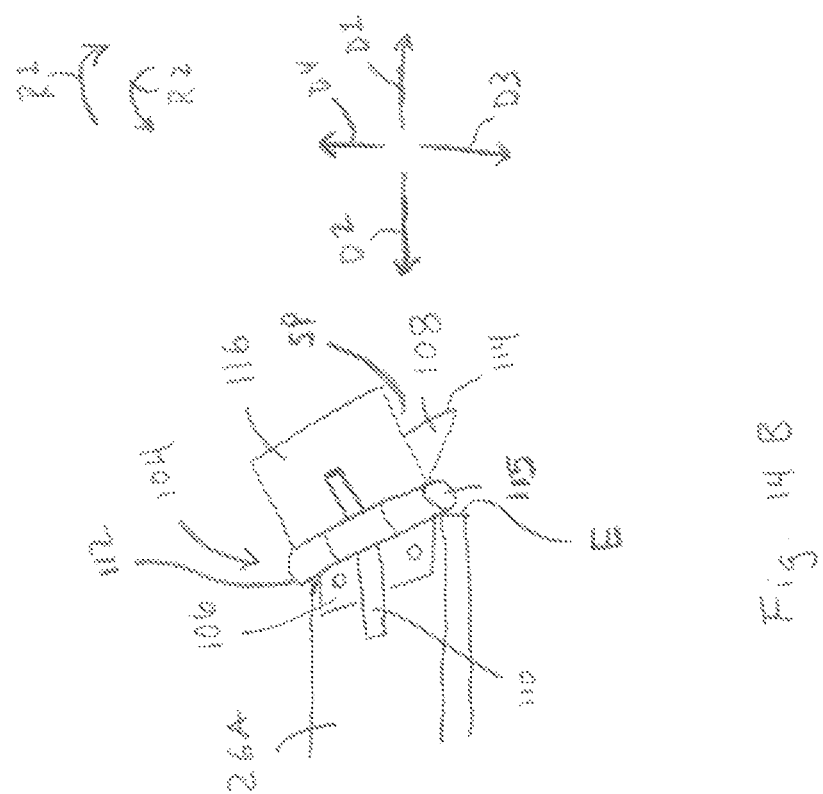

FIGS. 11A and 11B are schematic drawings showing respective configurations of rigger element 62 for the ski conversion device shown in FIG. 1. The rigger element is connectable to a ski 26 and includes runner element 66. In a first position, for example as shown in FIG. 11A, the runner element is locatable between skis 26A and 26B. In a second position, for example as shown in FIG. 11B, the runner element is locatable beyond the first ski in a direction from the second ski toward the first ski. For example, the runner element is beyond side 72 of ski 26A in direction L2 from ski 26B toward ski 26A. In an example embodiment, element 66 includes central element 64 connectable to a ski, for example, ski 26A and arm 68 connecting the runner element to the central element. Element 64 can be connected to the ski by any means known in the art, including, but not limited to, threaded fasteners or rivets.

In an example embodiment, the height of the runner element, for example, with respect to the top or bottom surface of the ski to which the rigger element is attached, and the lateral distance LD of the runner element from the ski to which the rigger element is attached can be adjusted, for example by using the arm. Although the rigger element is shown attached to ski 26A, it should be understood that the rigger element can be attached to ski 26B instead. It also should be understood that a respective rigger element can be attached to each of the skis. It should be understood that more than one rigger element can be attached to a ski. It should be understood that a rigger element is not limited to a particular position on a ski.

In an example embodiment (not shown) bottom surfaces 46 of skis 26A and 26B and bottom surface 73 of the runner are co-planar. Thus, the runner acts to add additional lateral stability, in particular for a level surface upon which the skis are traversing. In an example embodiment, for example as shown in FIG. 11A, bottom surface 73 of the runner element is located, in direction D3 from the top surface toward the bottom surface of the ski, beyond the bottom surface of the respective surface 46. Thus, surface 73 is off-set in direction D3. In an example embodiment, for example as shown in FIG. 11B, the bottom surface of the runner element is located, in direction D4, opposite direction D3, beyond the bottom surface of the ski. For example, for this position, the position of the runner element with respect to the bottom surface of ski 26 can be set such that skis 26 bear the main weight of the trailer and the rigger element act as an outrigger to stabilize the trailer against sideways tipping. Thus, surface 73 is off-set in direction D4. Thus, the runner acts to add additional lateral stability for a surface, in particular, an uneven or sloped surface, upon which the skis are traversing.

For example, if the ski device and trailer are being used on a groomed trail with grooves in the surface for cross-country skis, and a rigger element is installed on one or both of skis 26, the rigger element or elements can be placed in the position shown in FIG. 11A, and the respective positions of the runner elements with respect to sides 70 can be set such that each runner element engages a respective groove. The respective positions of the runner element with respect to the bottom surfaces of skis 26 can be set such that the runner element bear the main weight of the trailer and skis 26 act as outriggers to stabilize the trailer against sideways tipping. Thus, advantage can be taken of the grooves to maintain the trailer in a stable position.

In an example embodiment, runner 66 is in the shape of a ski. Runner 66 is not limited to a particular length, width, or shape. In an example embodiment, arm 68 includes portion 71 disposed within central portion 64. In an example embodiment, portion 71 swivels, or rotates, within central portion 64 to attain the first and second positions noted above. Portion 71 is lockable in the first or second positions by any means known in the art, for example, pins 75. In an example embodiment (not shown), central portion 64 and portion 71 have matching configurations, for example, both have a square shape, such that portion 71 can slide in and out of portion 64 and is fixed with respect to the central portion when disposed within the central portion. To move arm 68 to the first or second position, portion 71 is lifted out of the central portion and then re-inserted with the arm in the desired orientation.

In an example embodiment, arm 68 includes lateral portion 74. In an example embodiment, the length of portion 74 is fixed. In an example embodiment, the length of portion 74 can be adjusted by any means known in the art. For example, portion 64 includes slot 78 and portion 74 is slidable through the slot. The position of portion 74 in the slot determines the distance from portion 64 to the runner element (the length of the arm). Portion 74 can be fixed in the slot by any means known in the art, for example, pin 80 and openings 82.

As noted above, the height of the runner element, for example, with respect to the top surface of a ski can be adjusted using the arm and any means known in the art. For example openings 84 in portions 64 and 71 and pin 75 can be used. Portion 71 is moved up or down within portion 64 until respective openings 84 in portions 64 and 71 associated with a desired position of the runner element are aligned. Pin 75 is then inserted in the respective openings to lock portion 71 with respect to portion 64. Pins 75 and 80 can be any pin known in the art. In an example embodiment, pins 75 and/or 80 include a quick release feature. In an example embodiment, portion 64 is integral to skis 26, for example, formed of a same piece of material as the top of the ski. It should be understood that the various components of rigger element 62 can be made integral, for example, the arm can be made integral to the runner element.

Further details are now provided. Each wheel of the trailer is positioned in a respective wheel brace. If the tires of the wheels are not in contact with one or both the side walls of the respective braces, for example, if the tires are narrower than the width of the wheel brace (distance between walls 34), shims (not shown) can be inserted to take up the space between the tires and the side walls. Any shim known in the art can be used. In an example embodiment, the shims are rectangular plates. In an example embodiment (not shown), the side walls for the wheel braces are laterally displaceable, that is, the width between the side walls in the wheel brace is adjustable to firmly grip a wheel inserted in the wheel brace. The wheel brace is not limited to any particular width adjustment.

The wheel braces, connecting elements, and shims, if used, stabilize the wheels in first and second direction substantially parallel to and orthogonal to, respectively, the axle for wheels 28. Specifically, connecting elements 20 are used to secure the wheels of the trailer to the wheel braces. For example, the connecting elements are positioned over respective inner circumferences, or rims, of the wheels. The connecting elements are secured to the wheel braces by any means known in the art and are tightened by any means known in the art. Tightening the connecting elements urges the wheels into the brace and in conjunction with the wheel braces and shims, if used, firmly holds the wheels in place in the wheel braces. That is, the straps prevent the wheels from rolling forward or backward within the wheel braces or from lifting out of the wheel braces. Thus, the connecting element arrangement enables a locking of the wheels of the trailer with the wheel braces.

To stabilize the trailer with respect to the skis, for example, to prevent the trailer from rocking by swiveling around the axle for the wheels, and to fix a desired orientation of the trailer with respect to the skis, orientation elements 22 are connected to the orientation braces and to the trailer. In an example embodiment, orientation elements 22 are looped through orientation braces 18 and a portion of the trailer. The straps are then cinched and tightened using any means known in the art. By adjusting opposing straps, for example, orientation elements 22A and 22B, the trailer is prevented, by the opposing forces applied to the trailer by the opposing straps, from swiveling about the axle. The orientation of the trailer with respect to the skis, that is, the position of the trailer with respect to the axle is determined by the respective lengths of opposing straps. For example, shortening orientation element 22A, while lengthening orientation element 22B, causes the trailer to rotate about the wheel axle in counterclockwise direction CCW.

Straps 22 exert force F1 urging the stroller or the bicycle trailer, for example, the respective connection points 23, toward the ski to which a respective orientation element 22 is attached, in particular to the brace 18 to which the orientation element is attached. The respective forces F1 for a ski 26 are constant and are in equilibrium to prevent rotation of the stroller or the bicycle trailer with respect to the axis of rotation.

In an example embodiment (not shown), one or more bands are placed about the trailer, or one or more securing elements are connected to the trailer, for example, a securing element is a clamp. The straps are secured to the band(s) or securing element(s), for example, rather than being placed, or looped, through a structural component of the trailer.

The yoke braces enable desired movement of the yokes, while limiting or eliminating undesired movement of the yokes. Thus, swivel portions of the yoke braces, for example, pins 42, provide pivoting connection between the yokes and the skis. For example, the swivel portion enables swiveling movement of the yokes in a direction roughly orthogonal to the ground, for example, D3 or D4, that is, an up-down movement, while substantially limiting sideways movement of the yokes, for example, in directions L1 or L2. Thus, movement of the distal ends of the yokes (the ends furthest from the trailer), for example, as would be associated with relative movement between a user of the conversion device and the trailer, for example, due to changes in the terrain or movement of the source of energy for propelling the ski conversion device, is accommodated while enabling the trailer to maintain a substantially stable orientation with respect to forward direction D2. For example, the trailer is not necessarily lifted by an upward motion of the distal ends of the yokes.

The source of energy for propelling device 10 is attached to the distal ends of the yokes by any means known in the art. In an example embodiment, padded waist belt 90 is connected to the distal ends of the yokes. In an example embodiment, the respective lengths of the yokes are adjustable. For example, each yoke includes telescoping portions 24A and 24B. Any telescoping configuration known in the art can be used. For example, portion 24B is slidable within portion 24A and any means known in the art can be used to secure the portions together. That is, once portion 24B is displaced within portion 24A to a desired extent, the portions can be locked together to maintain the relative position of the portions. Portions 24A and 24B are not limited to any particular length or diameter.

In an example embodiment, the yokes are modular. For example, portions 24A and 24B can be connected by any quick-disconnect joint 92 known in the art and one or more additional yoke portions can be inserted between, or at either end of, portions 24A and 24B. Also, one or both of portions 24A and 24B can be removed or replaced with a different length of yoke. Thus, the respective overall lengths of the yokes can be customized and made proportional to the size or preference of the end user. Connecting the yokes to a belt or harness system enables a person pulling trailer 12 on skis 26 to keep their hands free. Yoke 24 is sufficiently rigid to maintain a substantially constant distance between the trailer and a person pulling the trailer. That is, the yokes hold the skis away from the source of energy for propelling the ski conversion device. The lateral, or side-to-side, rigidity of the yokes in the yoke braces keeps the trailer aligned with a person pulling the trailer, preventing the trailer from sliding laterally. That is, the rigidity of the connectors minimizes lateral movement of the trailer with respect to the person while maintaining the ability of the yokes to swivel in an up-down direction.

In an example embodiment, attachment devices, for example, clips, connected to ends 32 of the yokes are suitable for connection to any device known in the art for interface with a person, animal, or machine pulling device 10, for example, including a backpack, clothing, a harness or trace for an animal, or a powered vehicle, such as a snow mobile.

Advantageously, the flexibility and adaptability inherent in device 10 enables device 10 to be used with a wide variety of bicycle trailers or strollers. For example, the wheel braces and the shims are adaptable to a wide range of wheel/tire widths. The length adjustability of the connecting elements enables the straps to be used with a wide range of wheels/tire widths and diameters. In like manner, orientation elements 22 are readily adaptable to a wide range of sizes and shapes for trailer 12 or stroller 13, for example, due to the adjustability of the straps and the ability for a user to select a location on the skis for the orientation braces. Thus, device 10 is usable with virtually any bicycle trailer or jogging stroller.

Although wheel braces 14, brake element 52, and rigger element 62 have been discussed with respect to bicycle trailer 12 and stroller 13, it should be understood that wheel braces 14, brake element 52, and rigger element 62 are useable with any wheeled trailer known in the art. By "wheeled trailer" we mean an apparatus having a carriage or body arranged to hold passengers or cargo, an axle connected to the carriage or body, and wheels connected to the axle.

FIG. 12 is a schematic drawing of ski conversion assembly 100 for a stroller or trailer. The following should be viewed in light of FIGS. 10 through 12. By "trailer" we mean any apparatus having a carriage or body designed to hold passengers or cargo. In some instances the trailer may include an axle attached to the carriage or body. In an example embodiment, assembly 100 includes braces 102 and rigger element 62. Braces 102 are arranged to fixedly attach to skis 26 and to attach to axle AX of stroller or trailer TR. Rigger element 62 is connectable to a ski 26 and includes runner element 66. In a first position, for example as shown in FIGS. 11A and 12, the runner element is locatable between skis 26A and 26B. In a second position, for example as shown in FIGS. 11A and 11B, the runner element is locatable beyond ski 26A in a direction from the ski 26B toward ski 26A. For example, the runner element is beyond side 72 of ski 26A in direction L2 from ski 26B toward ski 26A. In an example embodiment, element 62 includes central element 64 connectable to a ski, for example, ski 26A and arm 68 connecting the runner element to the central element. Element 64 can be connected to the ski by any means known in the art, including, but not limited to, threaded fasteners or rivets.

The height of the runner element, for example, with respect to the top surface of a ski, can be adjusted using the arm and any means known in the art. For example, openings 84 in portions 64 and 71 and pin 75 can be used. Portion 71 is moved up or down within portion 64 until respective openings 84 in portions 64 and 71 associated with a desired position of the runner element are aligned. Pin 75 is then inserted in the respective openings to lock portion 71 with respect to portion 64. Pins 75 and 80 can be any pin known in the art. In an example embodiment, pins 75 and/or 80 include a quick release feature, for example a clamp. In an example embodiment, portion 64 is integral to skis 26, for example, formed of a same piece of material as the top of the ski. It should be understood that the various components of rigger element 62 can be made integral, for example, the arm can be made integral to the runner element.

Brace 102 can be any brace known in the art. Although only one brace 102 (on ski 26A) is shown in FIG. 12, it should be understood that the discussion for brace 102 on ski 26A is applicable to a brace 102 on ski 26B. Portion 102A of brace 102 is arranged to be fixedly connected to ski 26A by any means known in the art, for example threaded fasteners or clamps. Portion 102B of brace 102 is arranged to attach to axle AX by any means known in the art. In an example embodiment, portion 102B is arranged to be inserted through a distal end of axle AX into a hollow space formed by axle AX. In an example embodiment, trailer TR is pivotable about brace 102, in particular, portion 102B. In an example embodiment, trailer TR is fixed with respect to brace 102. Portion 102C of brace 102, connecting portions 102A and 102B, provides clearance for trailer TR.

FIG. 13A is a detail of brake element 104. In an example embodiment, assembly 100 includes brake element 104 including: portion 106 arranged to be fixedly secured to a ski, for example, end E of ski 26A; and portion 108 pivotably connected to portion 106 and arranged to extend past end E of ski 26A in direction D1.

FIG. 13B is a detail of brake element 104 in FIG. 13A with a resilient element. In an example embodiment, brake element 104 includes resilient element 110 urging portion 108 in direction D3. Portion 106 can be connected to ski by any means known in the art, including, but not limited to, threaded fasteners or rivets. Brake element 104 pivots with respect to the ski, for example, hinge, or pivot, 112 connects portions 106 and 108. For movement of the ski across a surface (not shown) in forward direction D2, the brake element is for pivoting with respect to the end of the ski such that portion 108 and distal end 114 of portion 108 slide over the surface without substantially hindering movement in the forward direction. That is, portion 108 and distal end 114 do not dig into, wedge into, or burrow into, the surface and the brake element offers only nominal resistance to movement across the surface. Stated otherwise, the force interaction of the brake element with the surface tends to push the brake element away from the surface in rotational direction R2. It should be understood that portion 108 can be a monolithic structure or can include a plurality of components, such as fingers or tabs.

For movement of the ski across the surface in backward direction D1, the body and distal end of the brake element pivot with respect to the ski, for example in rotational direction R1, such that the distal end and the distal edge engages, burrows into, or digs into, the surface to resist movement of the ski in the backward direction. That is, the force interaction of the brake element with the surface tends to cause the brake element to dig into, wedge into, or burrow into the surface more readily, inhibiting the movement of the ski in direction D1. The distal end can include features such as surface texture, concavity, or protrusions to enhance burrowing into the surface.

Resilient element 110 urges portion 108 and distal end 114 in direction R1 as well. Thus, the resilient element urges portion 108 and distal end 114 into positive engagement with the surface with which the ski, for example ski 26A, to which the brake element is attached, is in contact. Thus, if the ski begins to displace in direction D1, the brake element engages the surface noted above and even more quickly blocks movement in direction D1. In an example embodiment, pivot 112 is formed as part of the ski, for example, a pin 115 passes through an opening formed in the end of the ski.

FIG. 14A is a detail of brake element 104. In an example embodiment, brake element 104 includes at least one portion 116 enclosing, with portion 108, space SP. For example, portions 108 and 116 form a V-shape. It should be understood that portion 116 can be a monolithic structure or can include a plurality of components, such as fingers or tabs. It also should be understood that shapes other than a V-shape can be formed by portions 108 and 116.

FIG. 14B is a detail of brake element 104 in FIG. 14A with resilient element 110. In an example embodiment, brake element 104 includes resilient element 110 and portion 116. Resilient element can be attached to portion 108 or portion 116.

Brake element 104 is in its operational state at all times. That is, the brake element maintains contact with the surface noted above at all times. There is no need to activate any type of engagement mechanism for the brake to be in contact with the surface noted above. In an example embodiment (not shown), brake element 104 is positionable so that portion 108 and distal end 114 do not contact the surface noted above, for example, enabling backward movement of the skis when desired.

FIG. 15 is a schematic drawing of ski conversion assembly 100 for a stroller or trailer. The following should be viewed in light of FIGS. 10 and 15. In an example embodiment, assembly 100 includes braces 118 and rigger element 62. Braces 118 are arranged to fixedly attach to skis 26 and to attach to body, or carriage, C for stroller or trailer TR. Rigger element 62 is connectable to a ski 26 and includes runner element 66. In a first position, for example as shown in FIGS. 11A and 15, the runner element is locatable between skis 26A and 26B. In a second position, for example as shown in FIG. 11B, the runner element is locatable beyond ski 26A in a direction from the ski 26B toward ski 26A. For example, the runner element is beyond side 72 of ski 26A in direction L2 from ski 26B toward ski 26A. In an example embodiment, element 62 includes central element 64 connectable to a ski, for example, ski 26A and arm 68 connecting the runner element to the central element. Element 64 can be connected to the ski by any means known in the art, including, but not limited to, threaded fasteners or rivets.

As noted above, the height of the runner element, for example, with respect to the top surface of a ski can be adjusted using the arm and any means known in the art. For example openings 84 in portions 64 and 71 and pin 75 can be used. Portion 71 is moved up or down within portion 64 until respective openings 84 in portions 64 and 71 associated with a desired position of the runner element are aligned. Pin 75 is then inserted in the respective openings to lock portion 71 with respect to portion 64. Pins 75 and 80 can be any pin known in the art. In an example embodiment, pins 75 and/or 80 include a quick release feature, for example a clamp. In an example embodiment, portion 64 is integral to skis 26, for example, formed of a same piece of material as the top of the ski. It should be understood that the various components of rigger element 62 can be made integral, for example, the arm can be made integral to the runner element.

Brace 118 can be any brace known in the art. Although only one brace 118 (on ski 26A) is shown in FIG. 15, it should be understood that the discussion for brace 118 on ski 26A is applicable to a brace 118 on ski 26B. Portion 118A of brace 118 is arranged to be fixedly connected to ski 26A by any means known in the art, for example threaded fasteners or clamps. Portion 118B of brace 118 is arranged to attach to carriage C by any means known in the art, for example fastener 120 passing through respective holes in bracket 122 and a hole or space formed by the carriage. Portion 118C of brace 118, connecting portions 118A and 118B, provides clearance for carriage C.

The following should be viewed in light of FIGS. 13A through 15. In an example embodiment, assembly 100 includes brake element 104 including: portion 106 arranged to be fixedly secured to a ski, for example, end E of ski 26A; portion 108 pivotably connected to portion 106 and arranged to extend past end E of ski 26A in direction Dl; and resilient element 110 urging portion 108 in direction D3. Portion 106 can be connected to ski by any means known in the art, including, but not limited to, threaded fasteners or rivets. Brake element 104 pivots with respect to the ski, for example, hinge, or pivot, 112 connects portions 106 and 108. For movement of the ski across a surface (not shown) in forward direction D2, the brake element is for pivoting with respect to the end of the ski such that portion 108 and distal end 114 of portion 108 slide over the surface without hindering movement in the forward direction. That is, portion 108 and distal end 114 do not dig into, wedge into, or burrow into, the surface and the brake element offers only nominal resistance to movement across the surface. Stated otherwise, the force interaction of the brake element with the surface tends to push the brake element away from the surface in rotational direction R2.

For movement of the ski across the surface in backward direction D1, the body and distal end of the brake element pivot with respect to the ski, for example in rotational direction R1, such that the distal end and the distal edge engages, burrows into, or digs into, the surface to resist movement of the ski in the backward direction. That is, the force interaction of the brake element with the surface tends to cause the brake element to dig into, wedge into, or burrow into the surface more readily, inhibiting the movement of the ski in direction Dl. The distal end can include features such as surface texture, concavity, or protrusions to enhance burrowing into the surface.

Resilient element 110 urges portion 108 and distal end 114 in direction R1 as well. Thus, the resilient element urges portion 108 and distal end 114 into positive engagement with the surface with which ski 26A, to which the brake element is attached, is in contact. Thus, if the ski begins to displace in direction D1, the brake element engages the surface noted above and even more quickly blocks movement in direction D1. In an example embodiment, pivot 112 is formed as part of the ski, for example, pin 115 passes through an opening formed in the end of the ski.

Brake element 104 is in its operational state at all times. That is, the brake element maintains contact with the surface noted above at all times. There is no need to activate any type of engagement mechanism for the brake to be in contact with the surface noted above. In an example embodiment (not shown), brake element 104 is positionable so that portion 108 and distal end 114 do not contact the surface noted above, for example, enabling backward movement of the skis when desired.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A ski conversion assembly, comprising:
    a rigger element for connecting to a first ski and including
        a runner element, wherein in a first position, the runner element is locatable:
        on a first side of the first ski; or,
        on a second side, opposite the first side, of the first ski.

2. The ski conversion assembly of claim 1, further comprising:
    first and second braces for attachment:
        to a stroller or trailer; and,
        to the first ski and to a second ski, respectively.

3. The ski conversion assembly of claim 2, wherein:
    when the runner element is locatable on the first side of the first ski, the runner element is between the first and second skis; and, when the runner element is locatable on the second side of the first ski, the runner element is beyond the first ski in a direction from the second ski toward the first ski.

4. The ski conversion assembly of claim 2, wherein:
the first and second braces are for receiving first and second wheels, respectively, of a stroller or trailer, the ski conversion assembly further comprising:
a plurality of connecting elements for fixing the first and second wheels with respect to the first and second wheel braces, respectively.

5. The ski conversion assembly of claim 1, wherein the rigger element includes a central element connectable to the first ski and an arm connecting the runner element to the central element.

6. A ski conversion assembly, comprising:
a brake element including:
a first portion arranged to be fixedly secured to an end of a first ski; and,
a second portion pivotably connected to the first portion and arranged to extend past an end of the first ski.

7. The ski conversion assembly of claim 6, further comprising:
first and second braces for attachment:
to a stroller or trailer; and,
to the first ski and to a second ski, respectively.

8. The ski conversion assembly of claim 7, wherein:
the first and second braces are for receiving first and second wheels, respectively, of the stroller or trailer, the ski conversion assembly further comprising:
a plurality of connecting elements for fixing the first and second wheels with respect to the first and second wheel braces, respectively.

9. The ski conversion assembly of claim 6, wherein the brake includes a resilient element urging the second portion in a direction from a top of the first ski toward a bottom of the first ski.

10. The ski conversion assembly of claim 6, wherein the brake includes at least one third portion:
fixedly connected to the second portion; and,
at least partially enclosing a space with the second portion.

11. A ski conversion assembly for a stroller or trailer, comprising:
first and second braces for attachment to first and second skis and for attachment to an axle of the stroller or trailer, respectively; and,
a rigger element for connecting to the first ski and including a runner element, wherein in a first position, the runner element is locatable:
between the first and second skis; or,
beyond the first ski in a direction from the second ski toward the first ski.

12. The ski conversion assembly of claim 11, wherein the rigger element includes a central element connectable to the first ski and an arm connecting the runner element to the central element.

13. A ski conversion assembly for a stroller or trailer, comprising:
first and second braces for attachment to first and second skis and for attachment to an axle of the stroller or trailer, respectively; and,
a brake element including:
a first portion arranged to be fixedly secured to an end of the first ski; and,
a second portion pivotably connected to the first portion and arranged to extend past the end of the first ski.

14. The ski conversion assembly of claim 13, wherein the brake includes a resilient element urging the second portion in a direction from a top of the first ski toward a bottom of the first ski.

15. The ski conversion assembly of claim 13, wherein the brake includes at least one third portion:
fixedly connected to the second portion; and,
at least partially enclosing a space with the second portion.

16. A ski conversion assembly for a stroller or trailer, comprising:
first and second braces for attachment to first and second skis and for attachment to a carriage of the stroller or trailer, respectively; and,
a rigger element for connecting to the first ski and including a runner element, wherein in a first position, the runner element is locatable:
between the first and second skis; or,
beyond the first ski in a direction from the second ski toward the first ski.

17. The ski conversion assembly of claim 16, wherein the rigger element includes a central element connectable to the first ski and an arm connecting the runner element to the central element.

18. A ski conversion assembly for a stroller or trailer, comprising:
first and second braces for attachment to first and second skis and for attachment to a carriage of the stroller or trailer, respectively; and,
a brake element including:
a first portion arranged to be fixedly secured to an end of the first ski; and,
a second portion pivotably connected to the first portion and arranged to extend past the end of the first ski.

19. The ski conversion assembly of claim 18, wherein the brake includes a resilient element urging the second portion in a direction from a top of the first ski toward a bottom of the first ski.

20. The ski conversion assembly of claim 18, wherein the brake includes at least one third portion:
fixedly connected to the second portion; and,
at least partially enclosing a space with the second portion.

* * * * *